United States Patent [19]

Kurita

[11] Patent Number: 5,144,507
[45] Date of Patent: Sep. 1, 1992

[54] CASSETTE TAPE RECORDING AND/OR REPRODUCING APPARATUS WITH A SINGLE PINCH LEVER ASSEMBLY

[75] Inventor: Kazuhito Kurita, Tokyo, Japan

[73] Assignee: Sony Corporation, Tokyo, Japan

[21] Appl. No.: 787,752

[22] Filed: Nov. 5, 1991

Related U.S. Application Data

[63] Continuation of Ser. No. 511,075, Apr. 19, 1990, abandoned.

[30] Foreign Application Priority Data

Apr. 27, 1989 [JP] Japan .................................. 1-108769

[51] Int. Cl.⁵ ...................... G11B 15/29; G11B 15/44; G11B 15/00
[52] U.S. Cl. ................................ 360/96.2; 360/74.1; 360/96.3
[58] Field of Search .............. 360/96.4, 96.2, 96.1, 360/74.1, 71

[56] References Cited

U.S. PATENT DOCUMENTS

| | | | |
|---|---|---|---|
| 4,583,139 | 4/1986 | Saito | 360/96.1 |
| 4,625,251 | 11/1986 | Tomita et al. | 360/96.1 |
| 4,638,385 | 1/1987 | Kohri | 360/96.4 |
| 4,639,800 | 1/1987 | Tanaka et al. | 360/96.2 |
| 4,779,147 | 10/1988 | Tanaka et al. | 360/96.1 |
| 5,023,742 | 6/1991 | Kunze | 360/96.2 |

FOREIGN PATENT DOCUMENTS

| | | |
|---|---|---|
| 58-131457 | 9/1983 | Japan . |
| 60-155031 | 10/1985 | Japan . |
| 2090459A | 7/1982 | United Kingdom . |

*Primary Examiner*—John H. Wolff
*Assistant Examiner*—Craig A. Renner
*Attorney, Agent, or Firm*—Philip M. Shaw, Jr.

[57] ABSTRACT

A cassette tape recording and/or reproducing apparatus in which a single pinch lever pivotally supports a pair of pinch rollers corresponding to a pair of capstans rotatable in directions opposite to each other. A head operating member such as a head base or the like is movable in a first direction in response to a play lever or a movement of the play lever, and can be moved in a second direction perpendicular to the first direction so that the pair of pinch rollers are alternately urged against the pair of capstans. Tape guides and a head supporting portion are formed unitarily with the pinch lever at the position between the pair of pinch rollers, allowing the relationship between the pinch rollers, the tape guides and the head to be determined with ease, which becomes advantageous in forming the tape path. Further, the number of parts can be reduced.

7 Claims, 12 Drawing Sheets

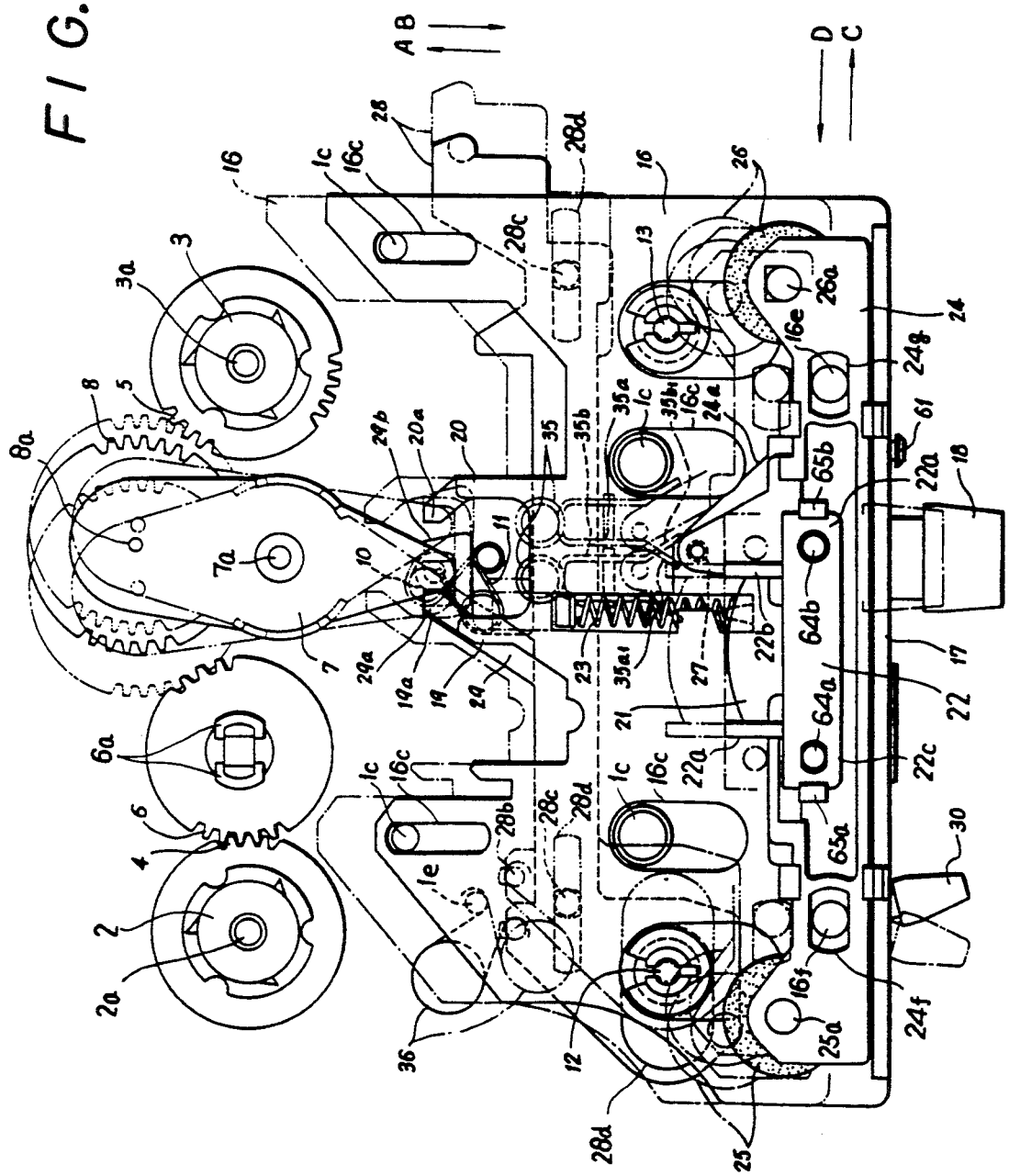

CASSETTE TAPE RECORDING AND/OR REPRODUCING APPARATUS WITH A SINGLE PINCH LEVER ASSEMBLY

This is a continuation of co-pending application Ser. No. 07/511,075 filed on Apr. 19, 1990 now abandoned.

BACKGROUND OF THE INVENTION

1. Field of the Invention

The present invention relates generally to a cassette tape recording and/or reproducing apparatus and more particularly relates to a so-called cassette deck of the auto-reverse type.

2. Description of the Prior Art

In a cassette tape deck of the auto-reverse type, various kinds of switching mechanisms have been proposed to switch the tape running direction. For example, Japanese Laid-Open Utility Model Gazette Nos. 58-131457 and 60-155031 describe mechanisms for switching the tape running direction.

According to the tape running direction switching mechanism described in Japanese Laid-Open Utility Model Gazette No. 58-131457, a pair of pinch rollers corresponding to a pair of left and right capstan shafts is pivotally supported by a pair of pinch roller levers, which are, in turn, pivotally and separately supported by a mechanical chassis at left and right sides of a head base plate so that, when the two pinch roller levers are selectively rotated by operation members, the pinch rollers come in rotatable contact with the corresponding capstan shafts through a tape to selectively rotate the two pinch roller levers, thereby switching the tape running direction.

In accordance with the tape running direction switching mechanism described in Japanese Laid-Open Utility Model Gazette No. 60-155031, a pair of pinch rollers corresponding to a pair of left and right capstans are pivotally supported by a common pinch roller base plate, and the pinch roller base plate and a head base plate are in such a relationship that they can be moved in the front and rear direction and can also be rotated with respect to each other. The pinch roller base plate is selectively rotated in the clockwise or counterclockwise direction relative to the head base plate by a slide lever. When the pinch roller base plate is selectively rotated by the slide lever, one pinch roller comes in rotatable contact with the corresponding capstan through a tape and the pinch roller base plate is rotated by the slide lever, thereby switching the tape running direction.

In the former mechanism, the pair of pinch rollers corresponding to the pair of left and right capstans are pivotally supported by the respective pinch roller levers separately and the two pinch roller levers are independently supported by the mechanical chassis. Further, the two pinch roller levers are selectively operated by the independent operation members so that the mechanism becomes complicated in arrangement. As a result, the number of parts is considerably increased, the assembly process is more complex, and hence the former mechanism necessarily becomes expensive.

In the latter mechanism, the pinch rollers are pivotally supported by the common pinch roller base plate. However, the pinch roller base plate is rotated relative to a head base plate by the slide levers to select one of the two pinch rollers and to place it in rotatable contact with the corresponding capstan. Therefore, the latter mechanism also becomes complicated in arrangement and cannot easily be simplified.

In these mechanisms, the pinch rollers, heads and tape guides are provided in different members, such that a correlation, i.e. a mutual positional relationship, cannot be easily determined. Thus, a tape path also cannot be easily formed.

OBJECT AND SUMMARY OF THE INVENTION

Accordingly, it is a general object of the present invention to provide an improved cassette tape recording and/or reproducing apparatus in which the above-described defects encountered with the prior art can be eliminated.

More specifically, it is an object of the present invention to provide a cassette tape recording and/or reproducing apparatus which can be simplified in arrangement.

It is another object of the present invention to provide a cassette tape recording and/or reproducing apparatus in which the number of assembly parts can be reduced.

It is still another object of the present invention to provide a cassette tape recording and/or reproducing apparatus in which the manufacturing cost can be reduced considerably.

It is a further object of the present invention to provide a cassette tape recording and/or reproducing apparatus in which a tape path can be formed with accuracy.

In the present invention, a cassette tape recorder for use with a magnetic tape and having a play button is comprised of a pair of capstans rotated in opposite directions, a pair of reel bases for rotating tape reels around which a magnetic tape is wound, a play base movable in a first direction perpendicular to a straight line connecting the pair of reel bases in response to operation of the play button, a single pinch lever having two ends for supporting at said ends a pair of pinch rollers corresponding to the pair of capstans, a selecting device for selectively moving the pinch rollers so that the pinch rollers are urged against the pair of capstans, a head supporting device for supporting a magnetic head, and a tape guide device for loading a magnetic tape on the magnetic head, wherein the play base is provided with a pinch lever supporting device for supporting the single pinch lever so that the single pinch lever can be freely moved in a second direction parallel to the straight line connecting the pair of reel bases.

The features and advantages described in the specification are not all inclusive and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 11 is a planar view of a main portion of the cassette tape recording and/or reproducing apparatus of the present invention;

DETAILED DESCRIPTION OF PREFERRED EMBODIMENTS

Figure 1:
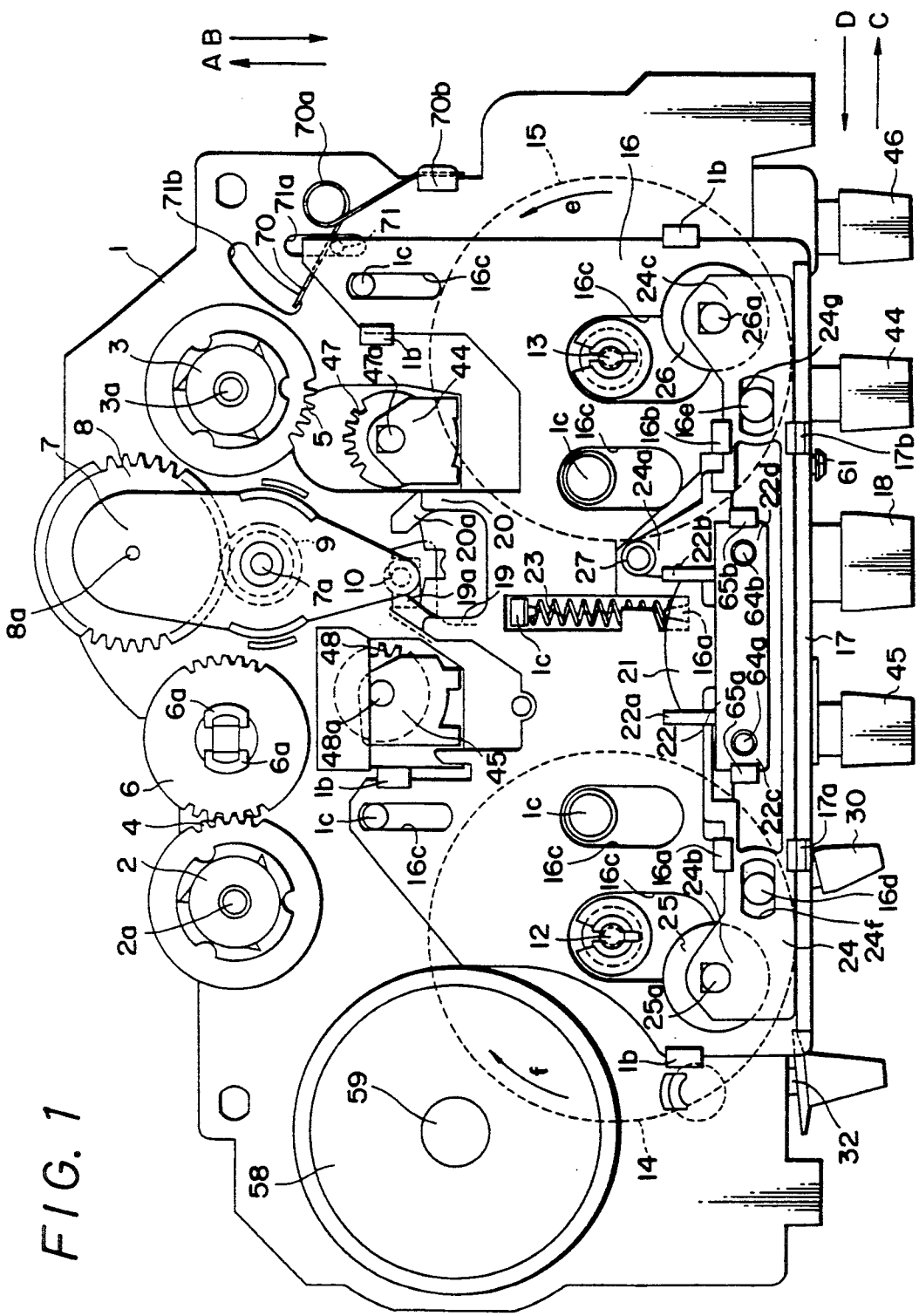
FIG. 1 is a planar top view of a cassette tape recording and/or reproducing apparatus according to the present invention.

A cassette tape recording and/or reproducing apparatus according to the present invention which is applied to a tape deck of cassette type will hereinafter be described in detail with reference to the drawings, in which like reference numerals are used to identify the same or similar parts in the several views. FIGS. 1 through 13B of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 2:
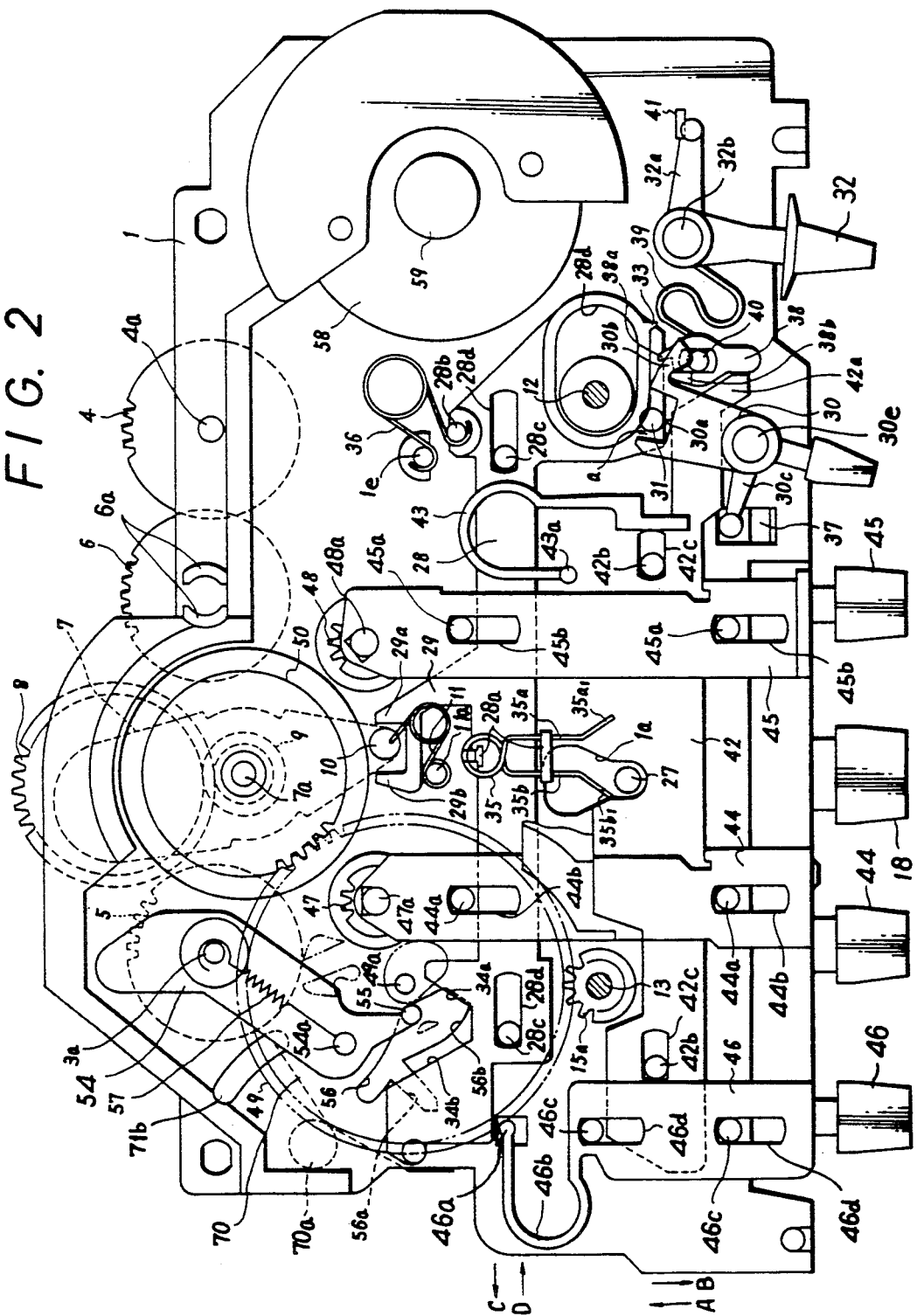
FIG. 2 is a bottom view of the cassette tape recording and/or reproducing apparatus of FIG. 1.

Referring to FIGS. 1 and 2, there is provided a main chassis 1 of a cassette type tape deck to which there are pivotally supported a drive shaft 2a of a supply reel base 2 and a drive shaft 3a of a take-up reel base 3. In the following description, the drive shaft 2a is referred to as an S-side reel shaft, whereas the drive shaft 3a is referred to as a T-side reel shaft. Gears 4 and 5 are coaxially formed on the two reel bases 2 and 3 respectively, and the gear 4 of the S-side reel base 2 is meshed with a rewind gear 6 pivotally supported on the main chassis 1 by means of a rotary shaft 6a.

A take-up lever 7 is pivotally supported on a rotary shaft 7a located on the main chassis 1 at the position between the gear 5 of the T-side reel shaft 3 and the rewind gear 6. At the outer end portion of take-up lever 7, a switching gear 8 is pivotally supported by a shaft 8a. This switching gear 8 is meshed with an interlock gear 9 coaxially supported by the rotary shaft 7a of the take-up lever 7. The switching gear 8 is selectively meshed with the T-side gear 5 or the rewind gear 6 by the swing movement of the take-up lever 7. As shown in FIG. 2, a protrusion 10 projects downward from the bottom surface of the inner end portion of the take-up lever 7 so that it faces the bottom surface of the main chassis 1. A toggle spring 11 is stretched between the protrusion 10 and a protrusion 11a formed on the main chassis 1. The take-up lever 7 is forced to move in either one of the two rotational directions by the toggle spring 11, whereby the switching gear 8 is positively meshed with the T-side gear 5 or the rewind gear 6.

As shown in FIG. 1, a reverse running side capstan 12 corresponding to the S-side reel base 2 and a forward running side capstan 13 corresponding to the T-side reel base 3 extend through and are supported by the main chassis 1. Flywheels 14 and 15 of pulley-shape, each having a capstan gear 15a provided at the center, are secured to capstans 12 and 13 respectively at the bottom surface side of the main chassis 1. For simplicity, the reverse running-side capstan is hereinafter referred to as an RVS-side capstan, and the forward running-side capstan is hereinafter referred to as a FWD-side capstan.

Figure 3:
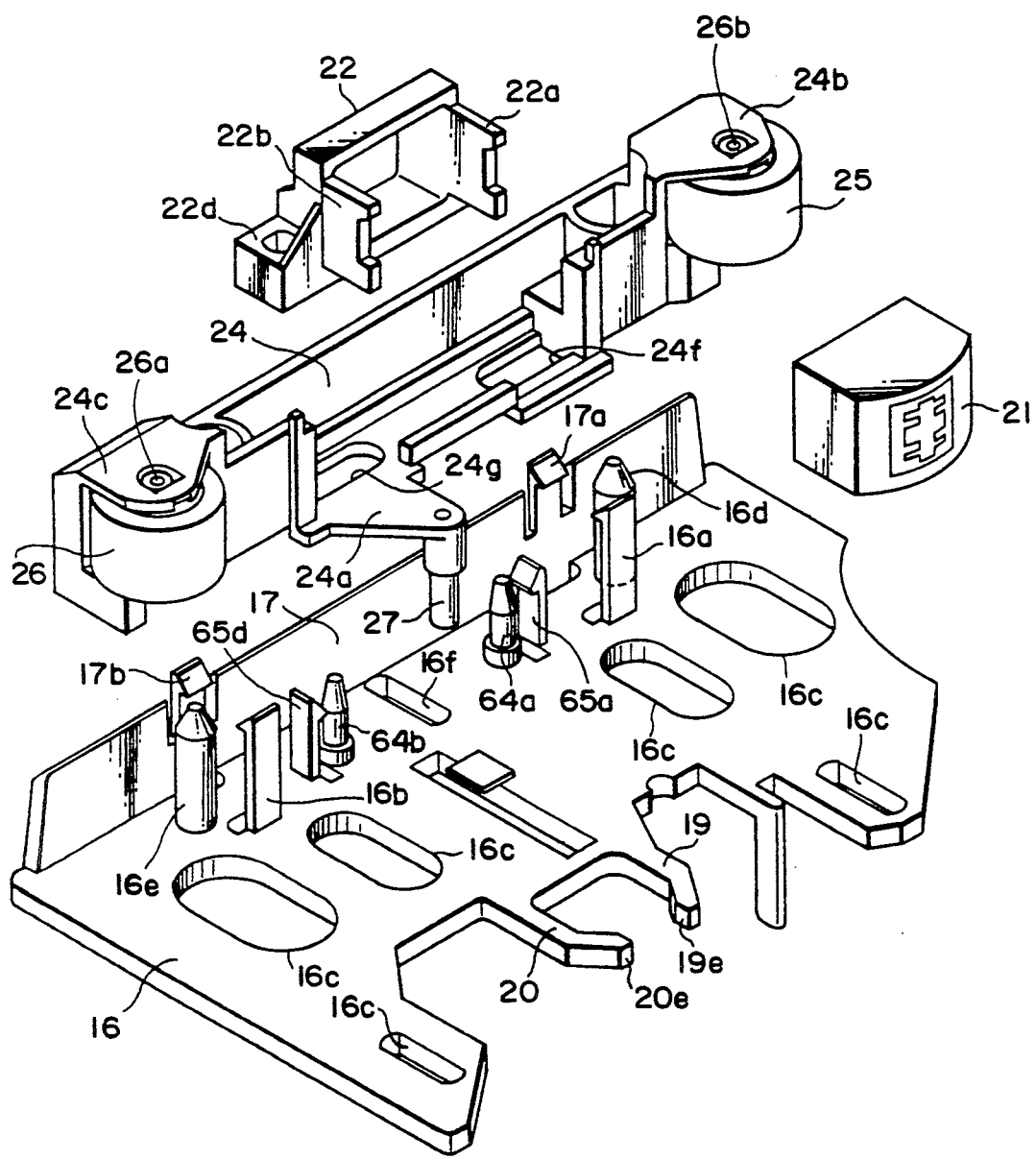
FIG. 3 is an exploded, perspective view of one portion of the cassette tape recording and/or reproducing apparatus of the present invention.

A play base 16 is attached to the top surface of main chassis 1 by means of guide pins 1c, guide nails 1b and guide openings 16c so that the play base 16 can slide in the direction toward the two reel bases 2 and 3 (in the direction shown by an arrow A). As shown in FIG. 3, rising wall surface 17 is integrally formed on play base 16 and a play operation member 18 is unitarily projected from the play base 16 as shown in FIGS. 1 and 11. From the other side of the play base 16, a pair of guide nail members 19 and 20 are elongated in a curved fashion such that they oppose the two sides of the protrusion 10 of the take-up lever 7 when the play base 16 is slid in the direction shown by the arrow A in FIG. 1. A magnetic head 21 is attached to the inside central portion of the rising wall surface 17 of the play base 16 through a holder 22. (The magnetic head 21 need not be a 4-channel reproducing head; use of a 4-channel record and/or reproduce head is also possible.) The play base 16 is spring-biased by a compression coil spring 23 extended between a protrusion 16a of the play base 16 and the protrusion 1c of the main chassis 1 such that the play base 16 is always biased to the front, or in the direction away from the reel shafts 2 and 3 as shown by arrow B in FIG. 1.

Referring to FIGS. 1 and 3, tape guides 22a and 22b are integrally formed with the inner end edge of the two side surfaces of head holder 22. Attaching portions 22c and 22d in the lateral directions are also formed on the two sides of the lower portion of the head holder 22.

A single pinch lever 24 is provided to pivotally support a pair of pinch rollers 25 and 26 spaced at a distance from each other slightly wider than that between the capstans 12 and 13. The pinch lever 24 is supported to the play base 16 to be slid in the lateral direction, i.e., in the direction at a right angle relative to the sliding direction of the play base 16 (shown by the arrows A and B), as shown by arrows C and D. The pinch lever 24 is supported by means of nail members 16a and 16b planted on the play base 16, nail members 17a and 17b formed on the rising wall surface 17, guide pins 16d and 16e projected from the play base 16 and guide apertures 24f and 24g formed through the pinch lever 24. An arm member 24a is projected from the inner edge of the pinch lever 24, and an engaging pin 27 is projected from the lower surface of the arm member 24a. This engaging pin 27 is projected toward the bottom side of the main chassis 1 through a generally triangular window aperture 1a (see FIG. 2) formed through the main chassis 1 through the aperture 16f of the play base 16.

Figure 4:
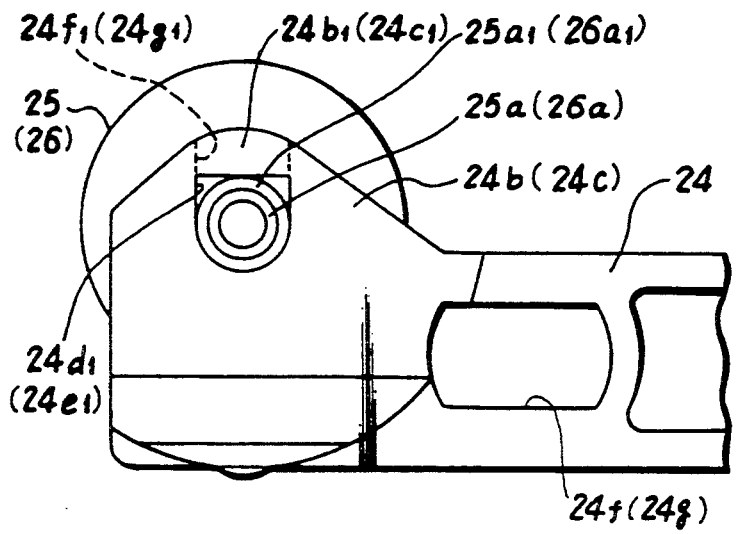
FIG. 4 is an enlarged planar view of one portion of a pinch lever of the cassette tape recording and/or reproducing apparatus of the present invention.

As best shown in FIG. 4, pinch rollers 25 and 26 are pivotally supported on the pinch lever 24 in a so-called click fashion by utilizing an elastic warping brought about by shaft support portions 24b and 24c having U-shaped openings provided at the two side portions of the pinch lever 24, and thin upper and lower support members $24b_1$, $24b_2$ and $24c_1$ and $24c_2$ of the support portions 24b and 24c.

Figure 5:
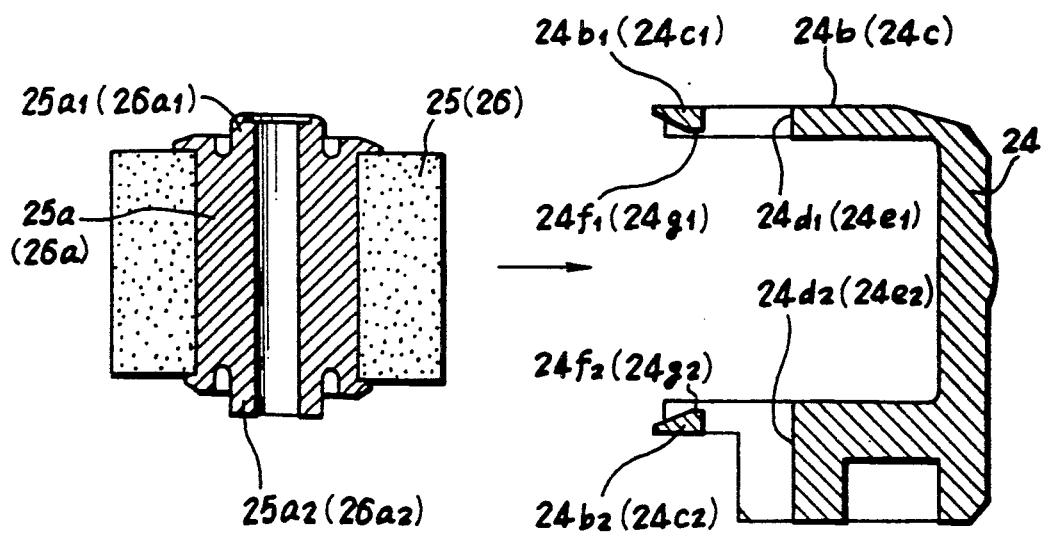
FIG. 5 is an enlarged, exploded, diagrammatic view of a section of the pinch lever of FIG. 4.
Figure 6:
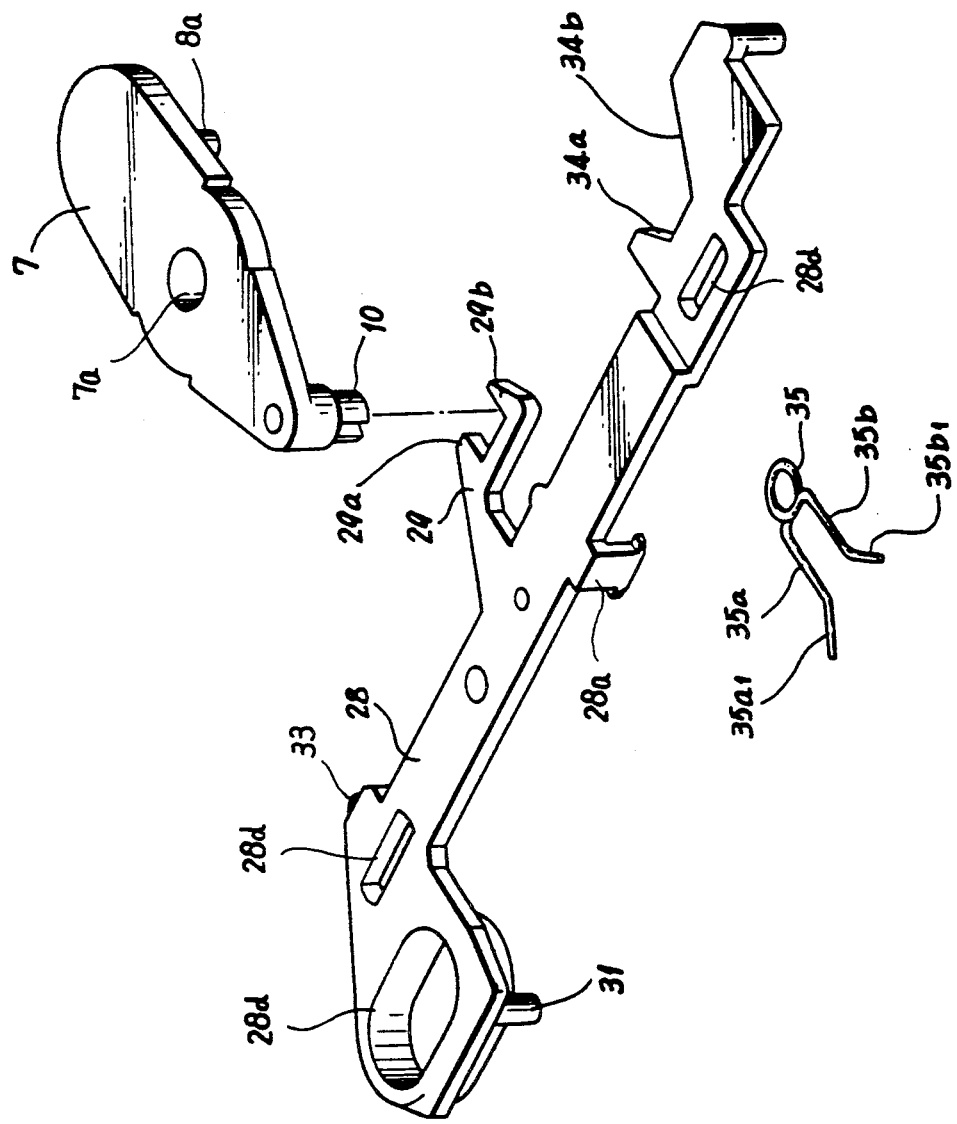
FIG. 6 is an enlarged, exploded, perspective view of a part of the cassette tape recording and/or reproducing apparatus of the present invention.

More specifically, as shown in FIGS. 4 and 5, circular protrusions $25a_1$, $25a_2$, $26a_1$ and $26a_2$ are projected from the respective ends of shafts 25a and 26a of the pinch rollers 25 and 26. Shaft apertures $24d_1$, $24d_2$, $24e_1$ and $24e_2$, which are engaged with these circular protrusions, are bored through the support members $24b_1$, $24b_2$, $24c_1$ and $24c_2$ of the shaft support portions 24b and 24c of the pinch lever 24. Further, grooves $24f_1$, $24f_2$, $24g_1$, and $24g_2$, each having a width which is substantially the same as the diameter of the shaft aperture, are formed through the inside surfaces of the supporting members from the end edges to the shaft apertures. The top portion of each of the grooves $24f_1$, $24f_2$, $24g_1$ and $24g_2$ is tapered and the peripheral edge of each of the shaft apertures $24d_1$, $24d_2$, $24e_1$ and $24e_2$ is made a straight line so as to form a D-shape.

As described above, the shafts 25a and 26a of pinch rollers 25 and 26 and the shaft support portions 24b and 24c of the pinch lever 24 are formed so that, when the pinch rollers 25 and 26 are pivotally engaged, the protrusions $25a_1$, $25a_2$, $26a_1$ and $26a_2$ of the shafts 25a and 26a are engaged with the grooves $24f_1$, $24f_2$, $24g_1$ and $24g_2$ of the support members $24b_1$, $24b_2$, $24c_1$ and $24c_2$ of the shaft support portions 24b and 24c and are pushed along these grooves $24f_1$, $24f_2$, $24g_1$ and $24g_2$, such that the circular protrusions $25a_1$, $25a_2$, $26a_1$ and $26a_2$ are thereby guided and clicked into the shaft apertures $24d_1$, $24d_2$, $24e_1$ and $24e_2$.

In the above-described engagement, the groove-side peripheral edges of the shaft apertures $24d_1$, $24d_2$, $24e_1$ and $24e_2$ are made as a straight line so that, when the protrusions $25a_1$, $25a_2$, $26a_1$ and $26a_2$ of the shafts 25a and 26a are engaged with the shaft apertures $24d_1$, $24d_2$, $24e_1$ and $24e_2$, while warping the support members $24b_1$, $24b_2$, $24c_1$ and $24c_2$ of the shaft support portions 24b and 24c, the range in which the protrusions $25a_1$, $25a_2$, $26a_1$ and $26a_2$ of the shafts 25a and 26a abut against the edge portions can be reduced considerably, thereby allowing the engagement to be performed very smoothly.

Also, the shaft apertures $24d_1$, $24d_2$, $24e_1$ and $24e_2$ are formed so as to enter the sides of the grooves $24f_1$, $24f_2$, $24g_1$ and $24g_2$, again permitting the range in which the protrusions $25a_1$, $25a_2$, $26a_1$ and $26a_2$ of the shafts 25a and 26a abut against the edge portions to be greatly reduced, thus again allowing the engagement to be performed more smoothly.

In this case, it is frequently observed that a clearance occurs between the protrusion of the shaft and the shaft aperture to cause the pinch roller to rotate with a very small lateral movement. However, when the pinch roller is urged against the capstan, the protruded portion of the shaft is brought in contact with the arcuate inner peripheral edge of the shaft aperture, thereby preventing the protruding portion of the shaft from disturbing the rotation of the pinch roller.

The above-described arrangement in which the pinch roller is pivotally supported on the pinch lever can also be applied to a case where a gear is pivotally supported to a support arm or the like. That is, in that case, a support member formed on a support arm which supports respective ends of shaft of a gear is formed thin and a groove is extended from the end edge to the shaft aperture, such that the groove side peripheral edge of the shaft aperture is formed in a straight line. This arrangement may be applied to a gear which is pivotally supported to a fast forward lever or to a rewind lever as will be described later.

As shown in FIG. 2, a change lever 28 is located on the bottom surface of the main chassis 1 by guide pin 28c implanted on the main chassis 1 and guide aperture 28d formed through the main chassis 1 so that it can be slid in the lateral direction, i.e. in the direction perpendicular to the sliding direction of the play base 16, similar to the pinch lever 24. The change lever 28 is provided at a central portion of a side edge opposed to the reel shaft, and has an engaging arm 29 which is comprised of a pair of engaging nails 29a and 29b on either side of the protrusion 10 of the take-up lever 7 with a predetermined space between them. On one end portion (the right end portion as viewed in FIG. 2) of the change lever 28 is formed a projection 31, to be engaged with a direction (DIR) lever 30, and a nail member 33 to be engaged with a shut-off lever 38. Contact edges 34a and 34b contacting with a pick-up lever, which will be described later, are formed on the other end portion of the change lever 28.

An engaging member 28a is provided at the central portion of the change lever 28, to which is engaged a torsion coil spring 35 having a pair of leg coil portions 35a and 35b. The torsion coil spring 35 is engaged to the engaging member 28a of the change lever 28 such that the pair of leg coil portions 35a and 35b are projected from the front edge side of the spring 35 with a predetermined spacing between them. Top portions $35a_1$ and $35b_1$ of the leg coil portions 35a and 35b are respectively curved outwardly to cause the opposed portions thereof to oppose the engaging pin 27 of the pinch lever 24.

The change lever 28 is forced to move in the two sliding directions shown by the arrows C and D in FIG. 2 by a toggle spring 36 stretched between a protrusion 1e formed on the main chassis 1 and a protrusion 28b formed on the change lever 28.

As shown in FIG. 2, the DIR lever 30 for switching the change lever 28 is pivotally supported to the main chassis 1 by a rotary shaft 30e, and an engaging portion 30a of a concave shape to be engaged with the protrusion 31 of the change lever 28 with a pre-determined spacing a protrudes from the top portion of the DIR lever 30. A pushing projection member 30b is formed on one side portion of the portion of the DIR lever 30, and an arm member 30c is projected from the pivot portion of the lever 30 in the lateral direction, whereby the top portion thereof is slidably contacted with a convex portion 37 formed on the main chassis 1, thereby allowing the DIR lever 30 to be rotated in a click-stop fashion.

A mode lever 32 is pivotally supported to the main chassis 1 by rotary shaft 32b, and the shut-off lever 38, having an engaging nail 38a corresponding to the nail 33 of the change lever 28, is unitarily coupled to the mode lever 32 by spring member 39. This shut-off lever 38 is movably supported by an engaging pin 40 protruded from the main chassis 1 so that, when the mode lever 32 is rotated, the shut-off lever 38 comes in contact with or disengages from the change lever 28 via the spring member 39. When the shut-off lever 38 is placed in the vicinity of the change lever 28, the engaging nail 38a is opposed to the nail 33. Further, in this condition, when the DIR lever 30 is rotated in one direction, the pushing protrusion 30b is engaged with the engaging nail 38a.

The mode lever 32 is provided with an arm member 32a which extends from the shaft support portion in the lateral direction. When the top of arm member 32a is slid over a convex portion 41 formed on the main chassis 1, the mode lever 32 is rotated in a click-stop fashion.

In this embodiment, mode lever 32, shut-off lever 38 and spring member 39 may be molded as one body by a resin-molding process.

A lock plate 42 is slidably provided on the bottom surface of the main chassis 1 by means of a side pin 42b provided on the main chassis 1 and a guide aperture 42c formed through lock plate 42 such that lock plate 42 can be slid in the lateral direction parallel to the change lever 28 as shown by arrow C or D in FIG. 2. Further, lock plate 42 is biased in one direction by a spring member 43, one end 43a of which is secured to the main chassis 1, and which is integrally formed with lock plate 42, such that the play lever 18, a fast forward operation lever 44, and a rewind operation lever 45 are locked in their operating positions by respective lock pins (not shown) of the lock portion 42d (see FIG. 12A).

Once one of these levers is locked in its operating position, lock plate 42 may be moved by a stop operation lever 46, one end 46a of which is secured to the main chassis 1, which is biased in one direction by a spring member 46b formed integrally with the stop operation lever 46 and guided by a combination of a guide pin 46c and a guide aperture 46d, thereby releasing the locked lever from the locked condition. The lock plate 42 is provided at one end portion in the slid and deviated direction with a pushed portion 42a corresponding to the shut-off lever 38. In the foregoing configuration, fast forward operation lever 44 is guided by a combination of a guide pin 44a and guide aperture 44b, and rewind operation lever 45 is guided by a combination of a guide pin 45a and a guide aperture 45b.

A gear 47 is pivotally supported to the top of the fast forward operation lever 44 by a shaft 47a, and meshes with the gear 5 of the T-side reel base 3. Similarly, a gear 48 is pivotally supported to the top of the rewind operation lever 45 by a shaft 48a and meshes with the rewind gear 6.

Figure 7:
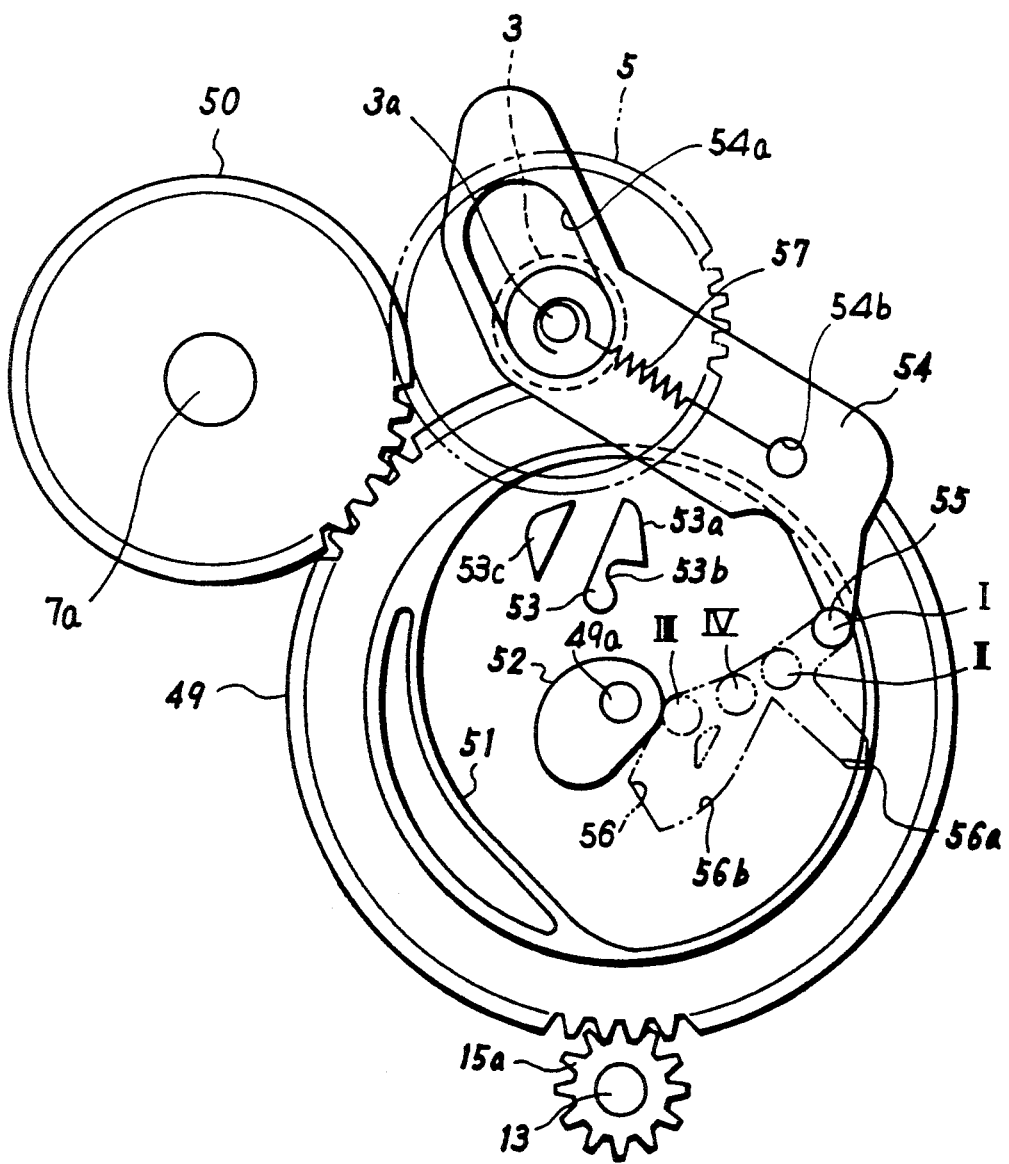
FIG. 7 is a fragmentary, planar view of a portion of the cassette tape recording and/or reproducing apparatus of the present invention.

A detection gear 49 is pivotally supported by a shaft 49a at the bottom surface of the main chassis 1 and is meshed between a capstan gear 15a and an intermediate gear 50. Capstan gear 15a is unitarily formed with flywheel 15 of capstan 13 corresponding to the T-side reel base 3. Intermediate gear 50 is coaxially connected to shaft 7a of the interlock gear 9 so that they may be rotated together. As shown in FIG. 7, the detection gear 49 is provided with an inside cam 51 and an outside cam 52 is formed at the center of the detecting gear 49 corresponding to the inside cam 51 on its plane opposing to the rear surface of the main chassis 1 at its outer peripheral side. A guide projection 53 extends between the inside cam 51 and the outside cam 52 in the radial direction of the detecting gear 49. The guide projection 53 is comprised of a first guide portion 53a which extends toward the outer edge of detecting gear 49, a second guide portion 53b which extends toward the center of detecting gear 49 and a third independent guide portion 53c.

A pickup lever 54 is provided between the bottom surface of the main chassis 1 and the detecting gear 49 and engages the shaft 3a provided at the lower end portion of the T-side reel base 3 such that it can be rotated and slid by a guide aperture 54a. On the top of pickup lever 54 is an engaging projection 55 which extends up and down. The upper portion of projection 55 engages a concave guide portion 56 formed on the bottom surface of the main chassis 1, while the lower portion of the projection 55 faces the detecting gear 49 at the side in which cams 51 and 52 are formed. A tension coil spring, friction spring 57, extends between a projection 54b provided on top of pickup lever 54 and shaft 3a provided at the lower end portion of the T-side reel base 3, such that pickup lever 54 is always biased in one direction.

As shown in FIG. 7, the concave guide portion 56 is formed in the area between the pivot portion of the detecting gear 49 and the outer edge of detecting gear 49 and includes first and second guide portions 56a and 56b in a branched fashion.

Referring to FIG. 1, a rubber belt (not shown) is extended between the flywheels 14 and 15, and is secured to the capstans 12 and 13 and a drive pulley 59 attached to a drive shaft of a motor 58. The belt rotates flywheels 14 and 15 in opposite directions as shown by arrows e and f in FIG. 1.

Figure 8:
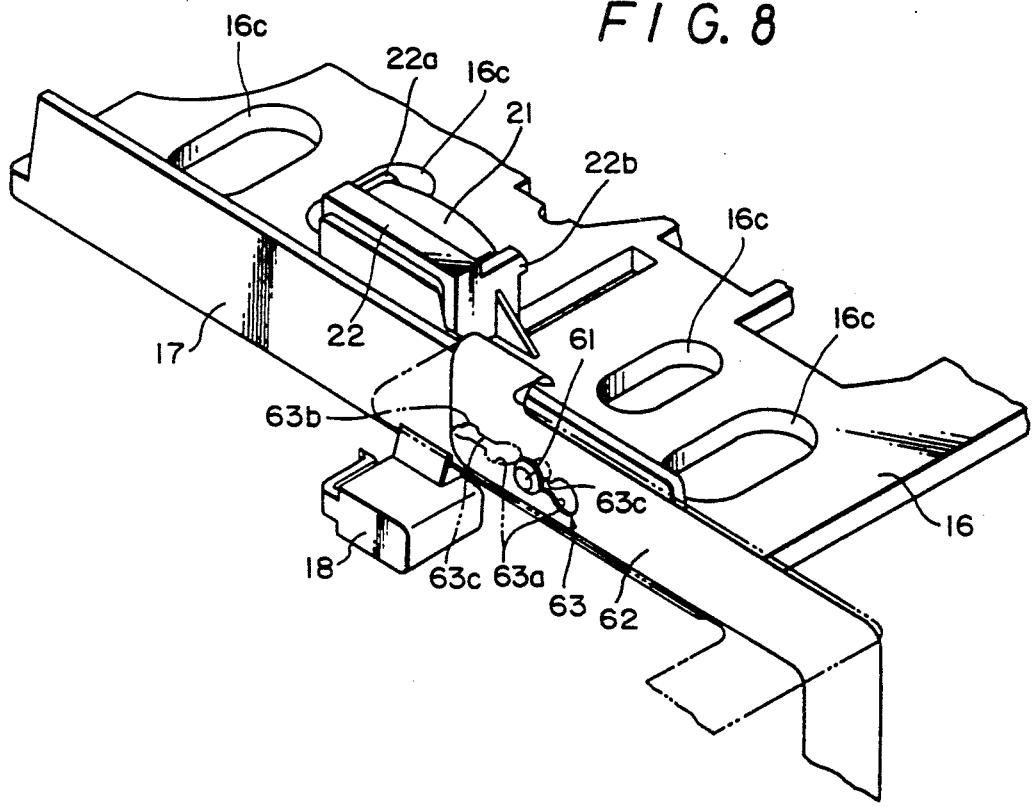
FIG. 8 is an enlarged perspective view of one portion of a play lever used in the cassette tape recording and/or reproducing apparatus of the present invention.

As shown in FIG. 8, an engaging pin 61 having a head of large diameter projects from the front outer surface of the rising wall surface 17 of the play base 16. An engaging aperture 63 is formed through a flexible printed circuit board 62 to be connected to magnetic head 21. The aperture 63 is comprised of a large diameter portion 63a having a diameter just larger than the head of engaging pin 61 and a small diameter portion 63b having a diameter just larger than the shaft portion but smaller than the head of engaging pin 61. Portions 63a and 63b are connected each other via a slit 63c.

When the magnetic head 21 is mounted on the play base 16, the flexible printed circuit board 62 is folded along the outer surface side of the rising wall surface 17, such that aperture 63 engages the engaging pin 61 through the large diameter portion 63a and circuit board 62 is then slid along rising wall surface 17, such that engaging pin 61 passes through slit 63c and is then engaged at the small diameter portion 63b, so that the flexible printed circuit board 62 is fixed to the play base 16.

Figure 9:
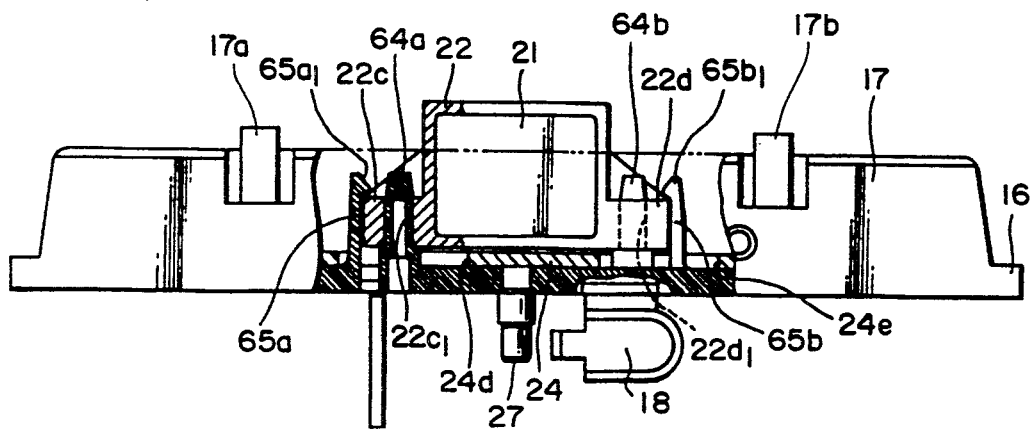
FIG. 9 is an enlarged diagrammatic view of a section of the cassette tape recording and/or reproducing apparatus in which a magnetic head is mounted.

As shown in FIGS. 3 and 9, on the head mount portion of the play base 16, a pair of projections 64a and 64b are provided which engage apertures $22c_1$ and $22d_1$ formed through the two mount portion 22c and 22d of the head holder 22. Next to projections 64a and 64b, toward the sides of main chassis 1, are engaging members 65a and 65b which have engaging portions $65a_1$ and $65b_1$ of triangular cross section. The end edges of the two mount portions 22e and 22d engage the engaging members 65a and 65b respectively.

The magnetic head 21 is mounted on the play base 16 as follows. Apertures $22c_1$ and $22d_1$ of the two side attaching portions 22c and 22d of head holder 22 are pushed down while contacting the corresponding projections 64a and 64b, such that the attaching apertures $22c_1$ and $22d_1$ are inserted onto the projections 64a and 64b. Simultaneously, the two mount portions 22c and 22d are pushed down while their end edges push the engaging members 65a and 65b outward, thus contacting engaging portions 65a₁ and 65b₁ under slight pressure. As a result, the end edges of the engaging portions 65a₁ and 65b₁ are engaged with the upper surface side of the end edges by the repulsive forces of the engaging members 65a and 65b, and the magnetic head 21 is secured to the play base 16. Thus, the magnetic head 21 is secured to the play base 16 in a so-called click fashion.

In this embodiment, the single pinch lever 24 is provided on the upper surface of the play base 16 and the magnetic head 21 is mounted on the upper surface of the play base 16 through the pinch lever 24, such that projections 64a and 64b and engaging members 65a and 65b project from the rectangular openings 24d and 24e formed in the lateral direction of the pinch lever 24. Thus, head holder 22 is held to the upper surface side of the pinch lever 24 by projections 64a and 64b and engaging members 65a and 65b.

Figure 10:
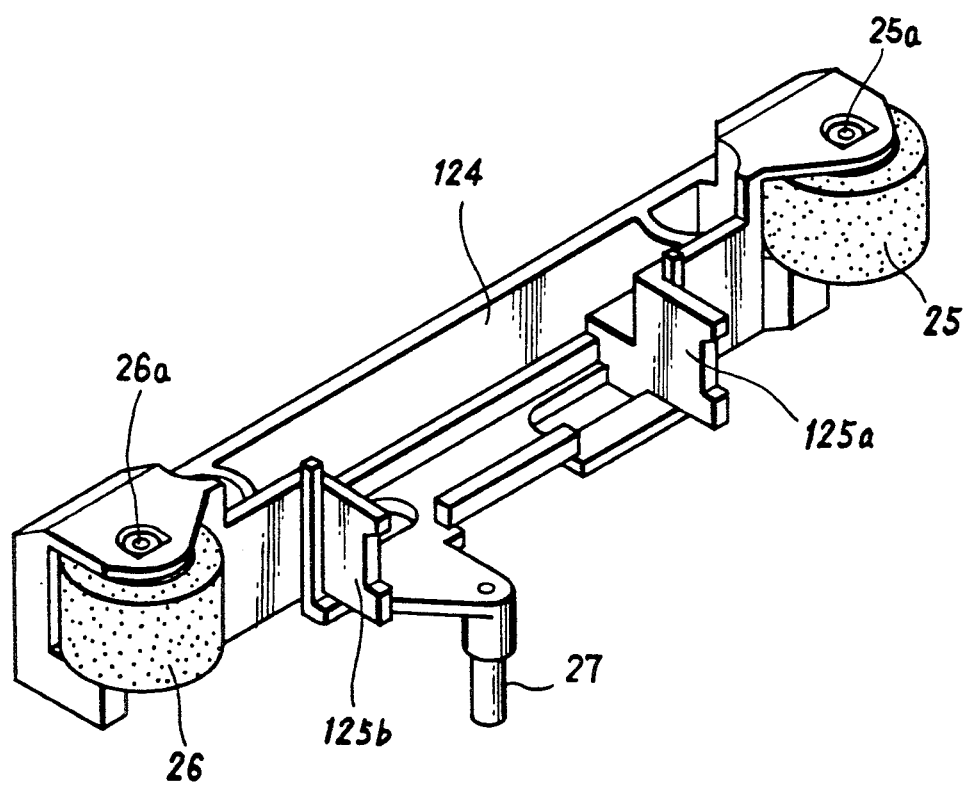
FIG. 10 is an enlarged perspective view of an alternative embodiment of the pinch lever used in the cassette tape recording and/or reproducing apparatus of the present invention.

FIG. 10 illustrates a second example of a pinch lever. Here the pinch lever 124 has tape guides 125a and 125b integrally formed within it across a portion in which the magnetic head 21 is mounted. The tape guides 125a and 125b are inserted into intermediate windows provided between a central window of the tape cassette into which the magnetic head 21 is inserted and the two side windows into which the pinch rollers are inserted to guide a tape. Thus, the positional relationship of the tape to the magnetic head and the two pinch rollers can be determined with ease, which is advantageous for determining the tape path.

In addition to the tape guides 125a and 125b, an erase head (not shown) may be attached to the pinch lever 124 together with the magnetic head 21, which is normally a record and/or reproduce head. If an erase head is used, it is also inserted into the intermediate window of the tape cassette. In that case, the pinch lever 124, the tape guide 125a and the head holder 22 may be integrally formed as one body.

Operation of a tape deck of this embodiment involves two basic operations, the forward running operation and the reverse running operation. In forward running, as shown by a solid line and a one-dot chain line in FIGS. 11 and 12, when the DIR lever 30 is rotated to the forward side (as shown by the solid line), change lever 28 is slid in the direction shown by an arrow D in FIG. 11 via projection 31 and is held at that slide position by toggle spring 36. In this condition, when projection 10 is engaged with engaging nail 29b of engaging arm 29 of change lever 28, take-up lever 7 is rotated in the clockwise direction. In this state, however, the projection 10 is brought in contact with the top portion of the curved end portion 19a of one guide nail member 19 in play base 16, so that take-up lever 7 is restricted in rotation. Also, the switching gear 8 provided at the outer end of the take-up lever 7 is held in the vicinity of the gear 5 of the T-side reel base 3.

Accordingly, when the play base 16 is slid in the direction shown by an arrow A in FIG. 11 by depressing the play operating button 18, the curved end portion 19a of the guide nail member 19 is disengaged from the projection 10 of the take-up lever 7, so that take-up lever 7 is released from being restricted in rotation and is rotated in the clockwise direction by the toggle spring 11, thereby meshing switching gear 8 with gear 5 of the T-side reel base 3 (as shown by the one-dot chain line in FIG. 11).

The pinch lever 24 mounted on the play base 16 is also moved in the direction shown by the arrow A in FIG. 11 together with the play base 16, such that engaging pin 27, which projects from the lower surface of the arm member 24a, is brought in contact with the curved top portion 35b₁ of one leg portion 35b of the torsion coil spring 35 and guided. Thus, pinch lever 24 is slid relative to the play base 16 in the direction shown by an arrow D in FIG. 11 so that the right pinch roller 26 is urged against one capstan 13 by the spring-biasing force of the torsion coil spring 35, and the tape deck is thus placed in the forward running condition (as shown by the one-dot chain line in FIG. 11).

Figure 12A:
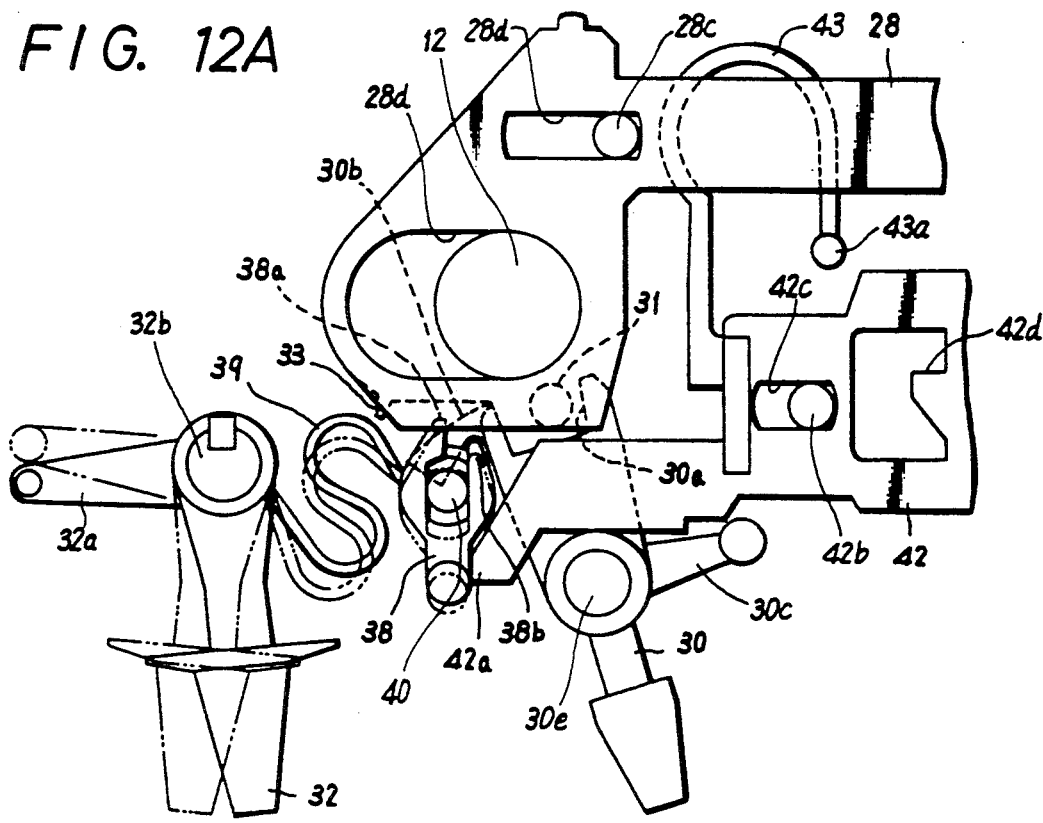
FIGS. 12A and 12B are schematic planar views of a portion of the cassette tape recording and/or reproducing apparatus of the present invention.
Figure 12B:
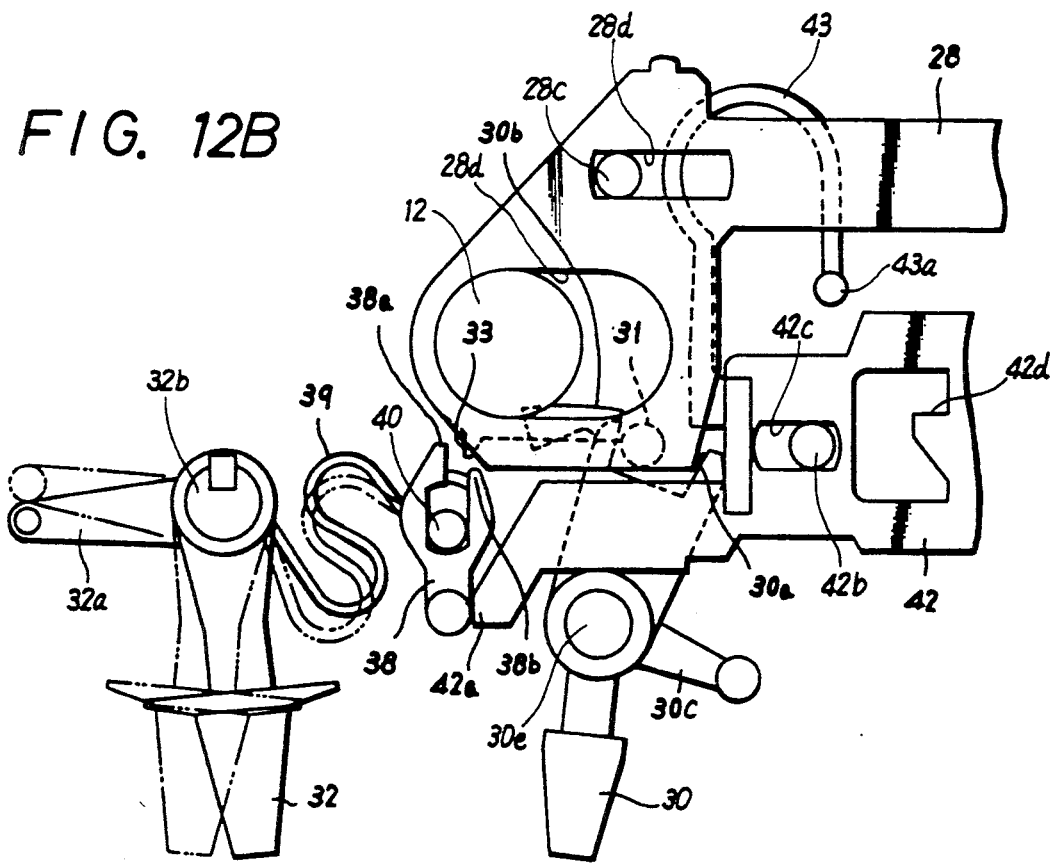

In the reverse running mode, the DIR lever 30 is rotated to the reverse side as shown by a two-dot chain line in FIGS. 11 and 12B. When this occurs, change lever 28 is slid in the direction shown by an arrow C in FIG. 11 via the projection 31 and is held at that slide position by the reversing resilient force of the toggle spring 36.

In this state, projection 10 is engaged with the other engaging nail 29a of the engaging arm 29 of the change level 8 and is rotated in the counterclockwise direction so that the projection 10 comes in contact with the top portion of the curved end portion 20a of the other guide nail member 20, thus restricting rotation of the take-up lever 7. Consequently, the switching gear 8 is held in such a state that it is placed in the vicinity of the rewind gear 6 which is meshed with the gear 4 of S-side reel base 2.

When change lever 28 is slid in the direction shown by the arrow C in FIG. 11, the torsion coil spring 35 is also moved and placed in the direction shown by the arrow C in FIG. 11 in synchronism with the change lever 28.

When play base 16 is slid in the direction shown by the arrow C in FIG. 11, as in the forward running mode, the curved end portion 20a of guide nail 20 is disengaged from projection 10 of the take-up lever 7, thus releasing take-up lever 7 from the restriction in rotation, and take-up lever 7 is rotated in the counterclockwise direction by toggle spring 11. Thus, switching gear 8 is meshed with the rewind gear 6 (as shown by the two-dot chain line in FIG. 11).

When engaging pin 27 of the pinch lever 24 is brought in contact with and slid along the curved top portion 35a₁ of the other leg piece portion 35a of the torsion coil spring 35, pinch lever 24, which is moved with play base 16 in the direction shown by the arrow A in FIG. 11, is slid in the direction shown by the arrow C in FIG. 11. As a result, left-hand side pinch roller 25 is urged against the other capstan 12 by the spring-biasing force of torsion coil spring 35, and the tape deck is placed in reverse running mode (as shown by the two-dot chain line in FIG. 11).

The above-described operations for switching the forward running mode and the reverse running mode can be performed even when the play lever 16 is depressed and slid in the locked state, i.e., even in the play mode. In that case, when the forward switching operation is performed, or when change lever 28 is slid in the left-hand side direction, switching gear 8 meshes with gear 5 of the T-side reel base 3, and pinch lever 24 is slid in the direction shown by the arrow D by the pushing resilient force of one leg piece portion 35b of the torsion coil spring 35, so that the right-hand side pinch roller 26 is urged against the one capstan 13.

Similarly, when a reverse running mode switching operation is performed, or when the change lever 28 is slid in the right-hand side, switching gear 8 is meshed with rewind gear 6 which in turn meshes with gear 4 of the S-side reel base 2. Also, the pinch lever 24 is slid in the direction shown by the arrow C by the pushing resilient force of the other leg piece portion 35a of torsion coil spring 35, so that the left-hand side pinch roller 25 is urged against the other capstan 12.

The forward play and reverse play operations are carried out when the tape cassette is loaded to the tape deck, i.e., under the condition that the two reel bases 2 and 3 are engaged into the reel hubs and the two capstans 12 and 13 are inserted into the capstan insertion apertures (not shown).

More specifically, when the DIR lever 30 is switched to the forward side or to the reverse side to slide the play base 16 with a pressure so that the play base 16 is locked by the lock plate 42, the magnetic tape (not shown) is contacted by and held between one capstan 13 and the pinch roller 26 or between the other capstan 12 and the pinch roller 25, and the magnetic head 21 is inserted into the tape cassette through the central window and is brought in contact with the magnetic tape.

Under this condition, the motor 58 is driven so as to rotate the capstans 12 and 13 in the reverse direction (as shown by the arrows e and f in FIG. 1) through the flywheels 14 and 15. Simultaneously, the rotation of flywheel 15 is transmitted to switching gear 8 of take-up lever 7 from the capstan gear 15a through the detection gear 49, the intermediate gear 50 and the interlock gear 9, so that the rotation of the switching gear 8 is transmitted to the T-side reel base 3 through the gear 5, or to the S-side reel base 3 through the rewind gear 6 and the gear 4, so that the T-side reel base 3 or the S-side reel base 2 are rotated.

When the T-side reel base 3 or the S-side reel base 2 is rotated, the magnetic tape within the tape cassette is transported at a constant speed in the forward or reverse running mode.

As described above, in this embodiment, one pinch lever 24 is provided with the pair of pinch rollers, i.e., the reverse pinch roller 25 and the forward pinch roller 26, being symmetrical with respect to the right and left directions. Further, this pinch lever 24 is slidably provided on the play base 16 in the right and left directions, so that the contact and non-contact of the respective pinch rollers 25 and 26 to and from reverse capstan 12 and forward capstan 13 may be switched. The movement of pinch lever 24 is carried out when the engaging pin 27 is engaged with torsion coil spring 35 provided in the change lever 28 as the engaging pushing means for the take-up lever 7 which transmits the rotation to the S-side and T-side reel base 2 or 3. As above, a single change lever 28 serves to selectively switch between the forward running mode and the reverse running mode. In stop mode, i.e., when the play base 16 is returned to the original position, pinch lever 24 is disengaged from torsion coil spring 35 so that a repulsive force from pinch lever 24 is not applied to change lever 28. Thus, when the play lever 16 is returned to the original position, a twisting force and the like can be avoided, and the play base 16 can be returned to its original position smoothly.

When play base 16 is returned to its original position, since the engaging pin 27 is placed at the vertex portion of the triangular-shaped guide aperture 1a provided through the main chassis 1, the pinch lever 24 is located at the neutral position. Further, the top portions 35a₁ and 35b₁ of the two leg portions 35a and 35b of the torsion spring 35 are curved outwardly so that, in the stop mode, even when the DIR lever 30 is changed-over in position, in the next play mode, pinch lever 24 can be slid smoothly in the direction switched by change lever 28 after engaging pin 27 is guided along one of the leg piece portions of torsion coil spring 35 by the depressing and sliding of play base 16.

Further, since take-up lever 7 is forced to move in the two rotational directions by toggle spring 7, when the toggle mechanism passes the dead point, the toggle mechanism need not be depressed fully. Thus, the stroke of change lever 28 can be reduced by the rotation of take-up lever 7. Therefore, the stroke of the change lever 28 can be held to a minimum, leads to more effective utilization of space. This means that if the stroke of change lever 28 is made sufficient, the position of take-up lever 7 can be prevented from having any effect upon change lever 28 in the play operation mode and in the stop operation mode. Conversely, the engagement of switching gear 8 can be prevented from being affected.

The respective operations of change lever 28 and take-up lever 7 can be prevented from being affected in location so that, in addition to the satisfactory returning of the play base 16, the memory of the position of the change lever 28 enables the change lever 28 to be directly employed in the DIR display. And as above, according to this embodiment, by the rotation of the DIR lever 30, the change lever 28 is switched by sliding to engage the forward running mode and the reverse running mode.

As shown in FIGS. 12A and 12B, the shut-off operation is carried out by the operation of the mode lever 32, so that the mode lever 32 may be switched to the two-way running mode, in which the forward running mode and the reverse running mode are continuously engaged, and to the continuous running mode in which the forward running and the reverse running are repeatedly engaged.

In the two-way running mode, where the forward running mode and the reverse running mode are continuously engaged, a shut-off lever 38 coupled by the mode lever 32 and the spring member 39 is pushed inwardly, i.e., the shut-off lever 38 is pushed in the direction of the change lever 28, whereby the engaging nail 38a provided at the top portion of the shut-off lever 38 is moved to the position in which the engaging nail 38a is meshed with the nail 33 of the change lever 28. Thus, when the change lever 28 is changed from the reverse running mode to the forward running mode, the nail 33 is engaged with the engaging nail 38a, so that the shut-off lever 38 is rotated, and the pushed portion 42a of the lock plate 42 is pushed. Thus, the lock plate 42 is slid in the lock releasing direction to release the locked condition of the play base 16, and the play base 16 is returned to the initial position, i.e., shut off.

The DIR lever 30 is not connected to the change lever 28; rather, there is a spacing a between the projection 31 of the change lever 28 and the engaging portion 30a of the DIR lever 30 so that, when the manual switching operation is performed by the DIR lever 30 which changes-over the mode of the change lever 28 from the reverse running mode to the forward running mode, if the DIR lever 30 is rotated, the pushing projection member 30b abuts the rising member 38b of the shut-off lever 39 before the engaging portion 30a pushes the projection 31. Accordingly, the shut-off lever 38 is pushed toward the outside, i.e., shut-off lever 38 is pushed in the direction in which it becomes distant from the change lever 28. Thus, the engaging nail 38a is out of the locus of the nail 33 of the change lever 28. Therefore, the shut-off lever 38 is not rotated when the forward running mode of the change lever 28 is switched by the DIR lever 30. In other words, the shut-off operation is not carried out.

When the mode lever 32 is changed to the continuous running side where the forward running mode and the reverse running mode are repeated, the shut-off lever 38 is pushed in the direction in which it is spaced apart from the change lever 28 by spring member 39. Thus, engaging nail 38a moves outside of the locus of the nail portion 33 of change lever 28 so that the change lever 28 can be freely slid to the forward running mode and to the reverse running mode. Simultaneously, lock lever 42 is not released from being locked, namely, the shut-off operation is not performed, so that the forward running and the reverse running are repeated continuously.

A mechanism formed of the detecting gear 49 and the pickup lever 54 for detecting the tape end and for carrying out the automatic switching is shown by FIGS. 7 and 13.

In this arrangement, the detecting gear 49 is rotated in one direction through the capstan gear 15a by the rotation of the capstan 13, while the pickup lever 54 is swung by the force in the rotational direction of the T-side reel base 3 via the friction spring 57.

More specifically, when the T-side reel base 3 is rotated in the forward running direction, the engaging projection 55 of the pickup lever 54 comes in slidable contact with the inner periphery of the inside cam 51 of the detecting gear 49 so that the pickup lever 54 swings in a range shown by I and II of FIG. 7. Similarly, when the T-side reel base 3 is rotated in the reverse running direction, engaging projection 55 of the pickup lever 54 is brought in slidable contact with the outer periphery of the outside cam 52 of the detecting gear 49 so that the pickup lever 54 is swung in a range shown by III and IV of FIG. 7.

When T-side reel base 3 stops rotating at the tape end, pickup lever 54 is positioned or centered either at the position II in FIG. 7 (in the forward running mode) or at the position IV in FIG. 7 (in the reverse running mode). When this happens, only the detecting gear 49 is rotated further so that engaging projection 55 of the pickup lever 54 is struck by the first guide portion 53a of the guide portion 53 when located at the position II, or by the second guide portion 53b when located at the position IV. Thus, the forward running mode and the reverse running mode respectively are automatically changed over.

Pickup lever 54 changes its centering position in the forward running mode and the reverse running mode, such that the striking position of the guide projection 53 is changed. Thus, the upper end portion of the engaging projection 55 is guided by the concave guide portion 56 formed on the main chassis 1 so that it is moved in two directions. Due to this change of its centering position, the pickup lever 54 can be directly switched to the right and left directions, i.e., the reverse running direction and the forward running direction.

Figure 13A:
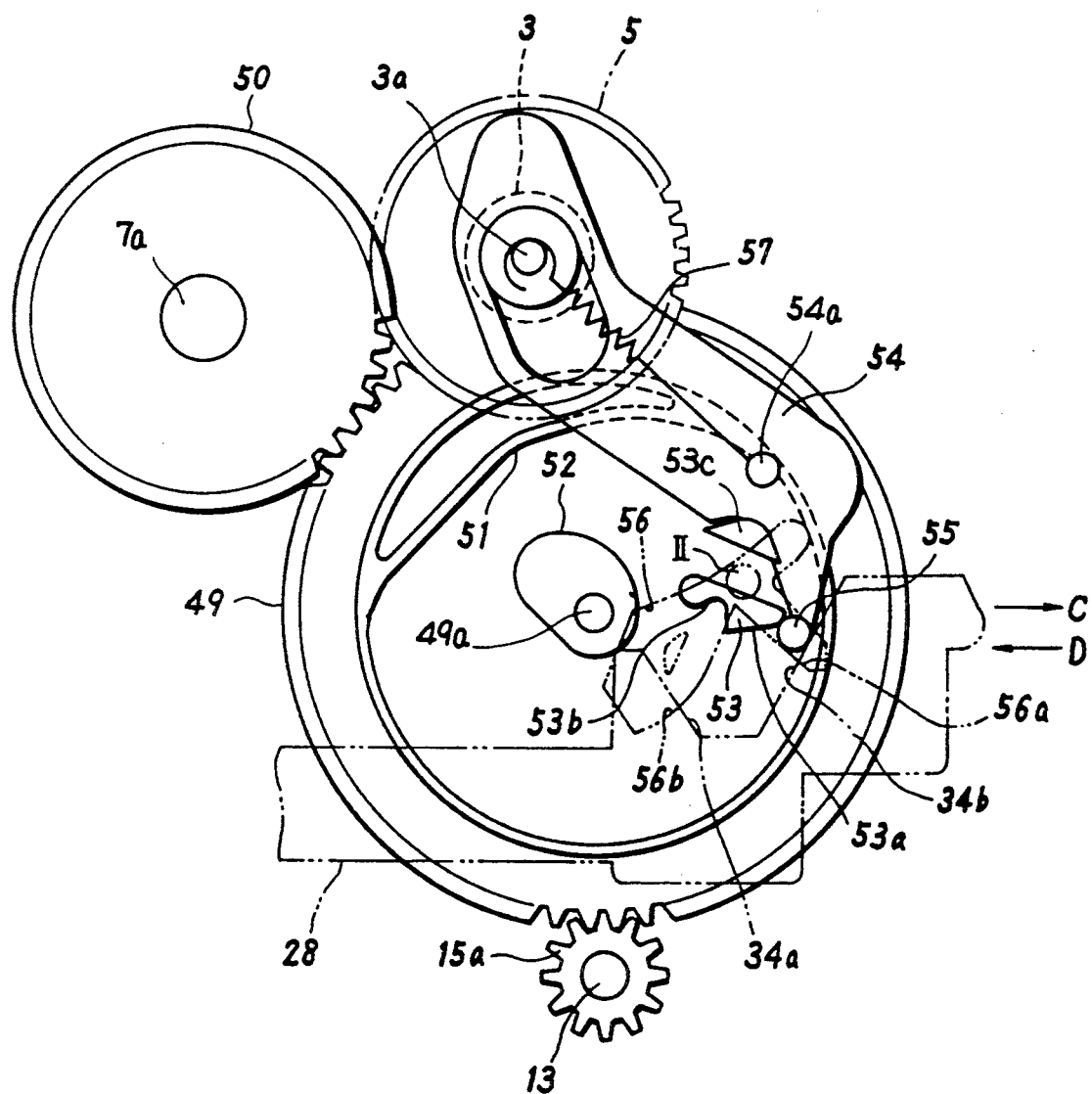
FIGS. 13A and 13B are schematic planar views of a portion of the cassette tape recording and/or reproducing apparatus of this invention.

First guide portion 56a and second guide portion 56b of concave guide portion 56 correspond to first and second guide edges 34b and 34a of change lever 28. Specifically, at the completion of the forward running mode, the engaging projection 50 of the pickup lever 54 positioned at the center position of point II in FIG. 13A is pushed in the direction of first guide portion 56a of concave guide portion 56 by the rotation of detecting gear 49. Therefore, the engaging projection 55 is brought into contact with first guide edge 34b of the change lever 28 which is opposed to the first guide portion 56a, to push the guide edge 34b, so that change lever 28 is slid in the right-hand direction shown by the arrow C, i.e., in the reverse running direction, and the mode of the tape deck is switched to the reverse running mode.

Figure 13B:
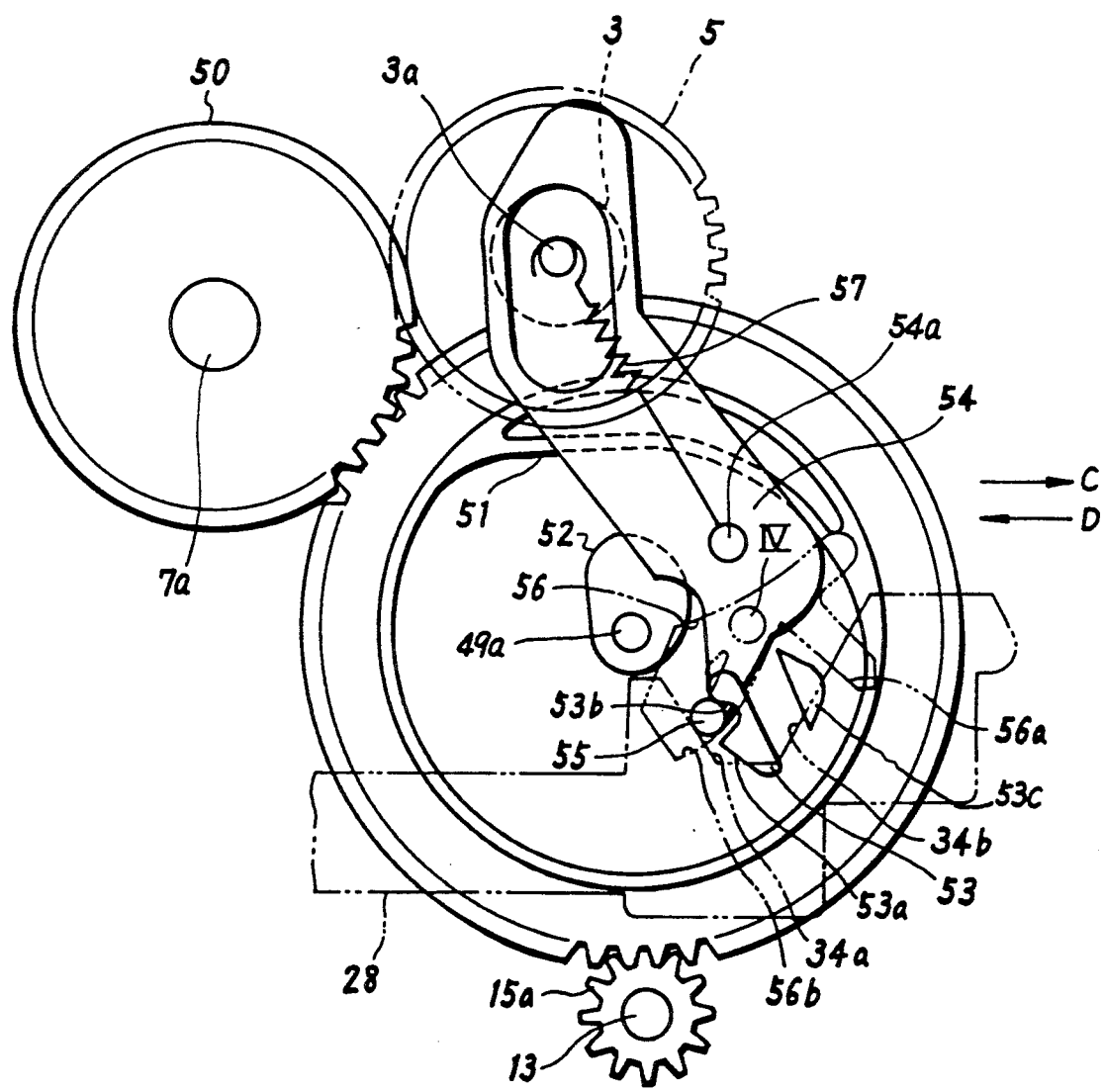

At the end of the reverse running mode, engaging projection 55 of pickup lever 54 which is positioned at the center position of the point IV of FIG. 13B is pushed by the second guide portion 53b of the guide projection 53 in its direction, so that the engaging projection 55 contacts the second guide edge 34b of the change lever 28 which is opposed to the second guide portion 56b. Thus, change lever 28 is slid in the left-hand direction, i.e., in the forward running direction shown by the arrow D, and the mode of the tape deck is switched to the forward running mode.

In the above-described arrangement, friction spring 57, which is a tension coil spring for taking the friction of the pickup lever 54, serves as a return spring when the pickup lever 54 is pushed and moved by guide projection 56 of detecting gear 49.

Even if the rewind operation is started when a tape cassette has not been loaded, T-side reel base 3 can be prevented from rotating so that the switching operation is repeated. To avoid this problem, in modes other than the play mode, as shown in FIG. 2, pickup lever 54 is always urged against the outside cam 52 of detecting gear 49 via the aperture 71b by one end of a preventing spring 70 stretched between the engaging portion 70a of the main chassis 1 and the engaging piece 70b. In the play mode, preventing spring 70 is pushed by the engaging pin 71 which slides along an escape aperture 71a and protrudes from the top of the play base 16 to keep it away from pickup lever 54.

As described above, in this embodiment, the mechanism for switching the running direction is comprised of very few parts, e.g., there is only one detecting gear 49 and one pickup lever 54.

From the above description, it will be apparent that the invention disclosed herein provides a novel and advantageous cassette tape recording and/or reproducing apparatus. The foregoing discussion discloses and describes merely exemplary methods and embodiments of the present invention. As will be understood by those familiar with the art, the invention may be embodied in other specific forms without departing from the spirit or essential characteristics thereof. For example, different configurations of the various components, or different means of engaging the components, could be used to the same effect as the specific embodiment described herein. Accordingly, the disclosure of the present invention is intended to be illustrative, but not limiting, of the scope of the invention, which is set forth in the following claims.

I claim:

1. An auto-reverse tape recording and/or reproducing apparatus for use with a cassette containing magnetic tape wound on reels, the tape recording and/or reproducing apparatus comprising:

a. a magnetic record and/or reproducing head assembly;
b. an operator actuated play button;
c. a pair of capstans rotatable in opposite directions with respect to each other;
d. a pair of reel bases for rotating the reels around which the magnetic tape is wound;
e. a play mode base movable in a first direction perpendicular to a straight line connecting the pair of reel bases in response to an operation of the play button;
f. a pair of pinch rollers spaced a distance apart and respectively corresponding to the pair of capstans;
g. a single pinch lever having two ends on each of which a different one of the pinch rollers is rotatably mounted;
h. head supporting means on the play mode base and between the capstans for supporting the magnetic record and/or reproducing head assembly;
i. tape guide means supported on the pinch lever and between the capstans for guiding the magnetic tape which contacts with the magnetic record and/or reproducing head assembly;
j. pinch lever supporting means on the play mode base for supporting the pinch lever so that the pinch lever can be freely moved in a second direction parallel to the straight line connecting the pair of reel bases; and
k. pinch roller engagement means for selectively sliding the pinch lever in the second direction so as to urge the pinch rollers against the capstans.

2. An auto-reverse tape recording and/or reproducing apparatus according to claim 1, wherein the pair of pinch rollers are supported by the pinch lever at a distance apart which is greater than the distance between the pair of capstans.

3. An auto-reverse tape recording and/or reproducing apparatus according to claim 1, wherein the pinch lever and the tape guide means are integrally formed as one body.

4. An auto-reverse tape recording and/or reproducing apparatus according to claim 1, wherein the pinch lever, the tape guide means and the head supporting means are integrally formed as one body.

5. An auto-reverse tape recording and/or reproducing apparatus according to claim 1 wherein the apparatus is of a type having a normal tape drive mode and a reverse tape drive mode and a drive motor and wherein the pinch roller engagement means comprises:

a changing lever moveable in the second direction between a first position and a second position in response to changing between the normal tape drive mode and the reverse tape drive mode, respectively;
a transmission gear;
means operatively connected to the changing lever for moving the transmission gear to transmit a drive force of the motor to the pair of reel bases when the changing lever is at the first position or the second position; and
pushing means for moving the pinch lever in the second direction and urging one of the pinch rollers against one of the capstans only when the play mode base is advanced.

6. An auto-reverse tape recording and/or reproducing apparatus for use with a cassette containing magnetic tape wound on reels, the tape recording and/or reproducing apparatus comprising:

a. a magnetic record and/or reproducing head assembly;
b. an operator actuated play button;
c. a pair of capstans rotatable in opposite directions with respect to each other;
d. a pair of reel bases for rotating the reels around which the magnetic tape is wound;
e. a play mode base movable in a first direction perpendicular to a straight line connecting the pair of reel bases in response to an operation of the play button;
f. a pair of pinch rollers spaced a distance apart and respectively corresponding to the pair of capstans;
g. a single pinch lever having two ends on each of which a different one of the pinch rollers is rotatably mounted, wherein the pinch lever has a plurality of guide groove portions;
h. pinch roller engagement means for selectively moving and urging the pinch rollers against the capstans;
i. head supporting means on the play mode base and between the capstans for supporting the magnetic record and/or reproducing head assembly;
j. tape guide means on the pinch lever and between the capstans for guiding the magnetic tape which contacts with the magnetic record and/or reproducing head assembly; and
k. pinch lever supporting means on the play mode base for supporting the pinch lever so that the pinch lever can be freely moved in a second direction parallel to the straight line connecting the pair of reel bases, and wherein the pinch lever supporting means includes a plurality of guide portions which are engaged with the plurality of guide groove portions.

7. An auto-reverse tape recording and/or reproducing apparatus according to claim 6, wherein the pinch lever supporting means further includes hooked shaped supporting members for capturing the pinch lever so that the guide groove portions and the guide portions can be prevented from being disengaged from one another.

* * * * *